Patented Aug. 28, 1934

1,971,769

UNITED STATES PATENT OFFICE 1,971,769

ELECTRIC MOTOR CONTROL SYSTEM

Herbert John Coates, Erdington, Birmingham, and Charles Wallace Saunders, Bramley, near Guildford, England, assignors to General Electric Company Limited, London, England Application February 18, 1933, Serial No. 657,332
In Great Britain February 23, 1932

9 Claims. (Cl. 172—274)

This invention relates to electric motor control systems and more particularly to alternating current motor control systems in which reversal of a motor is effected by means of switches arranged between the motor and a generator adapted to supply power to the motor and in which variation of field flux accompanying the operation of reversal results in the flow of induced currents in the main connections. In such systems the currents may be induced by reduction of the flux in the generator field, or if a synchronous motor is employed, the currents may be induced by reduction of the flux both in the generator field and in the motor field and although the reversing switches may be interlocked so that operation thereof can occur only when the controller controlling the field of the generator and/or of the motor, is in a zero or equivalent position, such safeguard is insufficient to ensure that no current or only a small or moderate current shall flow whilst a reversing switch operates, since if the generator field, or the motor field if a synchronous motor is employed, is reduced from a high to a low or zero value just before the reversing switching means is opened, heavy induced currents are liable to flow in the main circuit notwithstanding that the master controller may be in the zero position. Such currents may be strengthened by the remaining or residual field flux of a rotating machine. Unless therefore the reversing switching means are highly rated there is a danger that they may be damaged or/and that they may fail to operate. An object of this invention is to overcome this disadvantage.

In an alternating current motor control system in which reversal of a motor is effected by means of switches arranged between the motor and a generator adapted to supply power to the motor and in which variation of field flux accompanying the operation of reversal results in the flow of induced currents in the main connections, according to the present invention, means associated with the control gear are adapted to prevent opening of a reversing switch while current of an undesirably high value flows therethrough.

According to one feature of the invention, means are provided for inhibiting opening of a reversing switch before the expiration of an agreed interval of time after reduction of the field excitation of the generator or motor, for the purpose of avoiding interrupting undesirably high induced currents at the contacts of the reversing switches.

In one arrangement in accordance with the invention opening of the switching means is prevented unless means responsive to the main current has assumed a zero or low current position and the zero or low current condition has persisted for a predetermined period of time. Thus in a particular embodiment applied to ship propulsion plant a current relay is energized through a current transformer from a phase of the main circuit and the relay is in a preventive position unless the current falls to a predetermined low value. When the relay is in the preventive position it completes the energizing circuit of an auxiliary relay that when energized closes a maintaining circuit for the coil of the direction contactor which is closed. This maintaining circuit is completed independently of a controller which effects deenergization of the generator field when turned to the zero position and which also, except when in the zero position, completes a maintaining circuit for the coil of the said direction contactor. Only when the controller is in the zero position, therefore, can the operation of a direction control switch be effective to cause one direction contactor to open and another direction contactor to close.

The auxiliary relay which closes quickly is arranged through any suitable form of time delay device, which will generally be adjustable, to open its contacts with a time lag and it therefore follows that only when the controller is in the zero position, the main current has fallen to the predetermined value and has remained at or below that value for the period of the time lag can the direction contactors be operated. The two direction contactors are of course interlocked so that the one must open before the other closes.

The auxiliary relay may be dispensed with, the current relay controlling the maintaining circuits directly and operating to interrupt the same with a time lag.

In a further arrangement in accordance with the invention, means are provided for mechanically locking a direction contactor closed until it can safely be opened.

Three arrangements in accordance with the invention applied to ship propulsion plants will now be described, by way of example, with reference to the accompanying drawings of which Figure 2 shows a circuit diagram for a similar arrangement employing main contactors of the type which are closed electrically, latched into the closed position and tripped out by an independent trip coil, while

In each of the examples shown, it is assumed that the motor is of the three phase synchronous type and derives its current from a turbine driven alternator, the general control being of the known kind in which the motor may be started up by first setting isolating switches and direction control switches to the desired position. An associated controller for the turbine is then moved to a position in which the turbine is run up to a speed of, for example 1/30 full speed, retaining circuits for the various contactors closed on motor and generator circuits then being completed. The master controller or controllers are then moved to a position, corresponding for example, to a turbine speed of 1/5 full speed. The alternator is then excited, double excitation being applied to its field, by closure of contacts on the master controller, and the motor is then run up as an induction motor to approximately 1/5 full speed. A sequence catch is provided which prevents further movement of the master controller until the motor is up to speed. When the motor is up to speed, the release of the sequence catch permits the movement of the controller into the next position in which the motor field is excited and the motor is then pulled into synchronism whilst a second sequence catch is provided which prevents further movement of the controller until the motor is in synchronism. In the next position, which may still correspond to a turbine speed of 1/5th full speed, excitation is applied to the field of an alternator booster which reduces the excitation of the alternator field to normal. An automatic variable speed governor on the turbine now comes in operation and further movement of the controller alters the variable speed governors for any speed between 1/5th and full speed. During the return movement of the master controller the field circuits of the alternator and motor are retained, by retaining contacts on the controller, until the controller has returned to the position in which the turbine was first run up to approximately 1/30th full speed, thus enabling the speeds of the motor to be controlled to very low speeds when desired. Below 1/5th full speed the control is independent of the automatic variable speed governor or governors provided on the turbine.

In the drawings the propulsion current circuits are all precisely similar, accordingly the general scheme will now be described with reference to the three drawings in which similar elements are similarly referenced. The alternator 201 is driven by a turbine 202, a booster set 203 also being associated and moving with the alternator 201. The alternator 201 is connected over lines 204, 205 and 206 through direction switches referenced respectively in Figures 1, 2 and 3 as elements 1, 2; 46, 47; 112, 113, to the motor 207 driving the propellor shaft and propellor 208.

Figure 1:
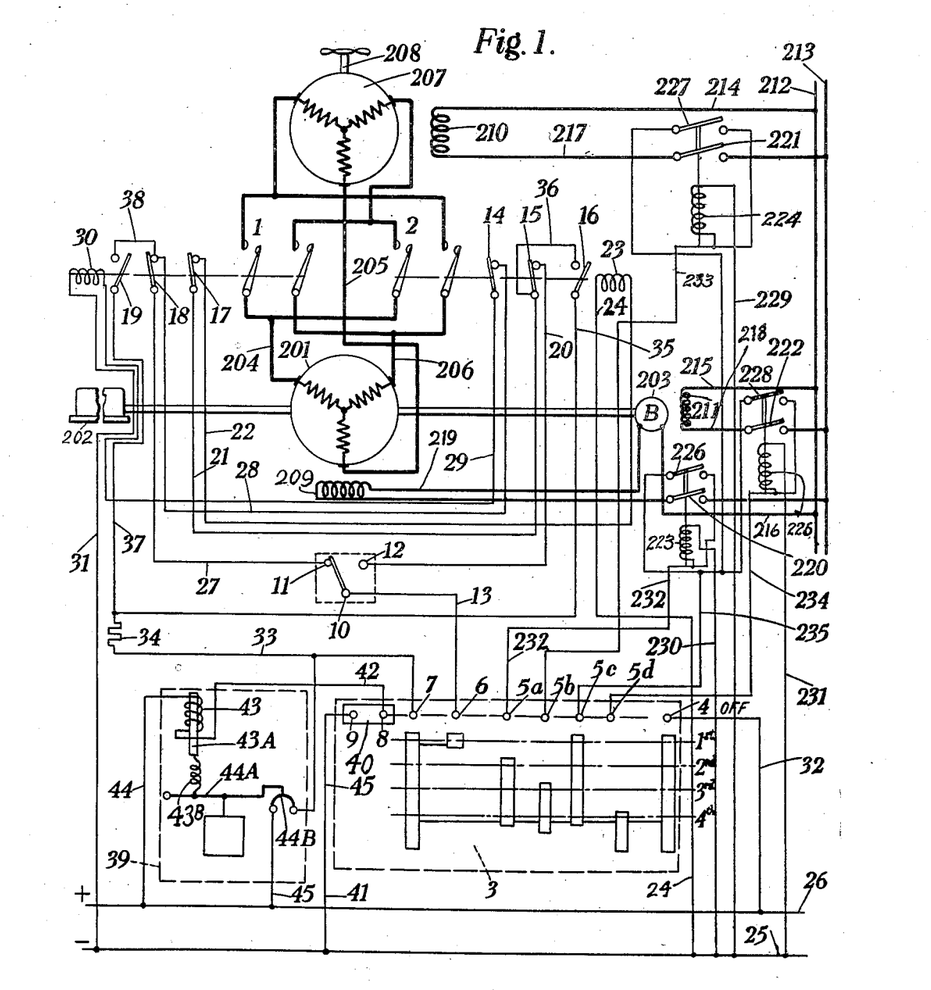
Figure 1 shows a circuit diagram for an arrangement employing standard type main contactors and comprising a time delay means for inhibiting the opening of switching means for controlling the connection of a propulsion motor to the main generator.
Figure 2:
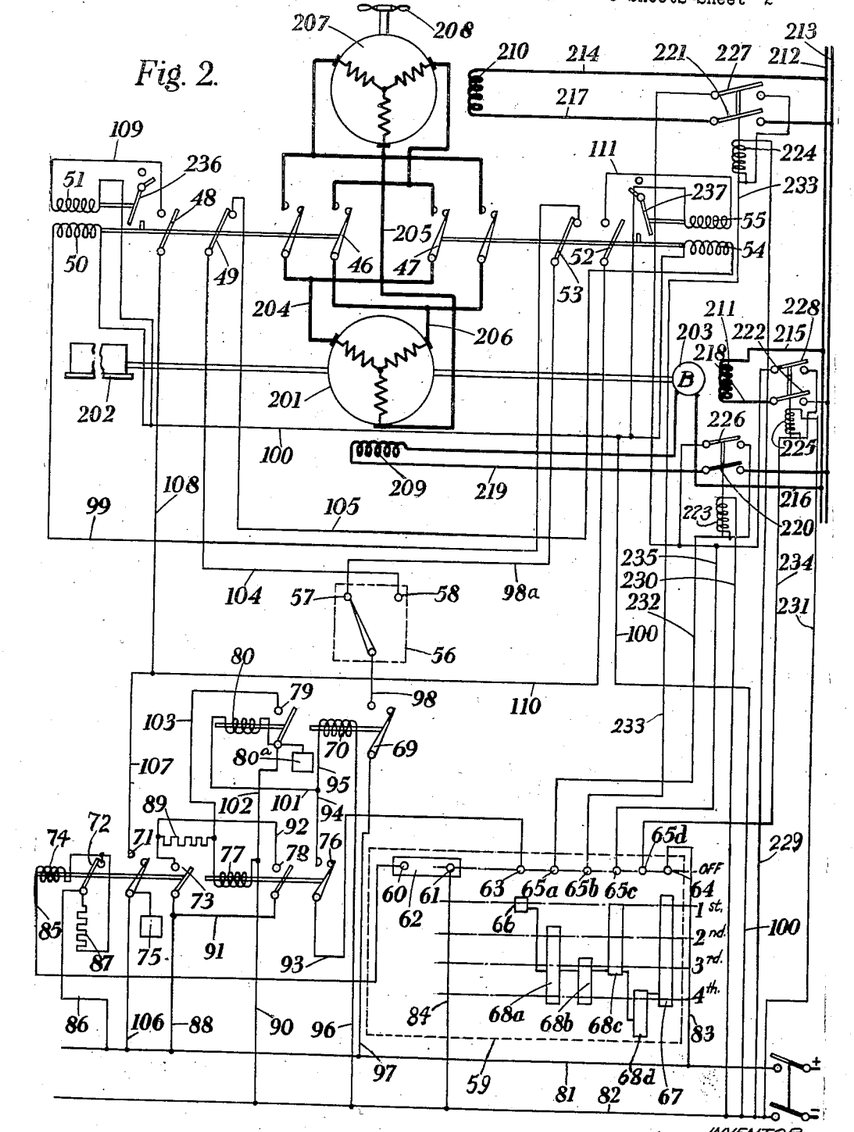
Figure 3:
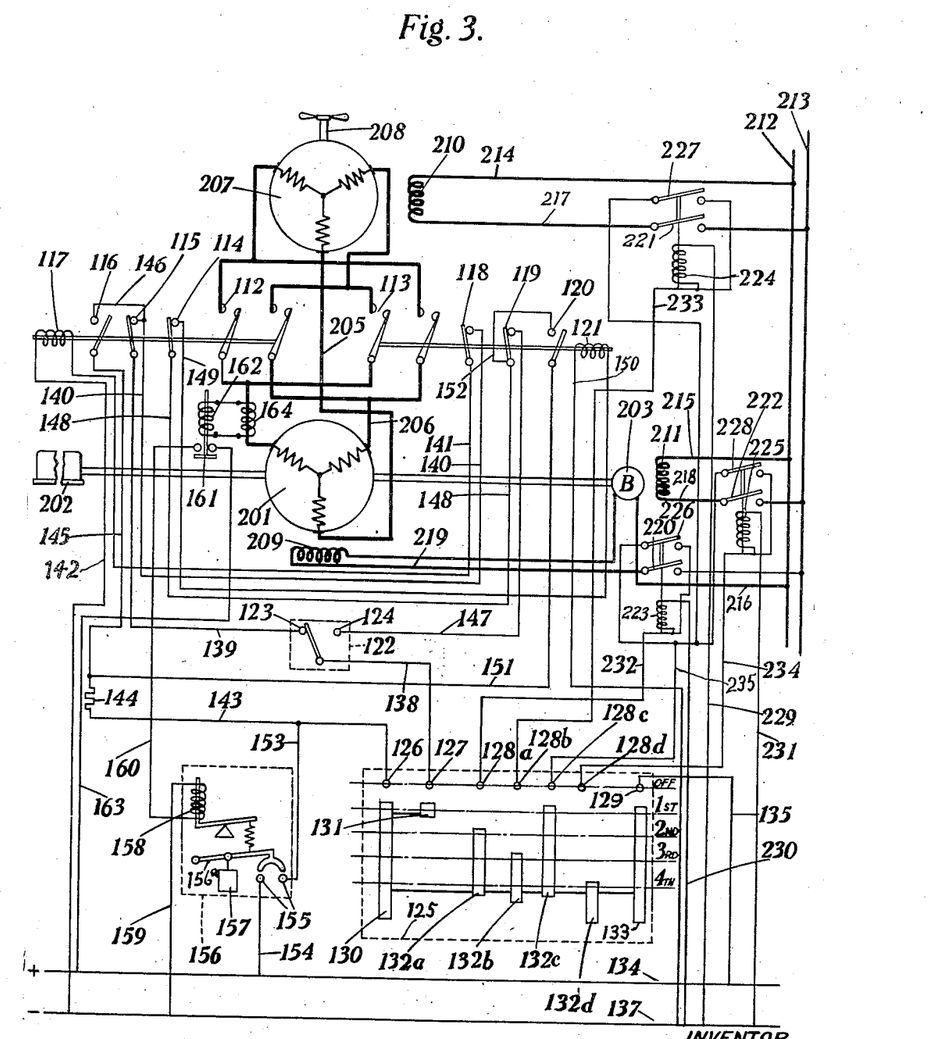
Figure 3 shows a circuit diagram for an arrangement in which the inhibition of the opening of the switching means is derived from means responsive to the main current. It is to be understood that only those parts of the control gear necessary for understanding the invention are shown in these drawings.

The field circuits of the alternator field 209, motor field 210 and booster field 211 are all energized from D. C. excitation bus-bars 212, 213 over lines 214, 215, 216 respectively on one hand and lines 217, 218, 219 and contactors 220, 221, 222 on the other.

The contactors 220, 221, 222 are of the "pull-on" type and are provided with energizing windings 223, 224 and 225 and are associated with auxiliary contactors 226, 227 and 228. One side of each of the windings 223, 224 and 225 is connected over lines 229, 230 and 231 to the negative auxiliary supply bus-bar 25, 82 and 137 (in Figures 1, 2 and 3 respectively), whilst the other side is connected to the respective finger on the drum control over the lines 232, 233, 234, or through the respective auxiliary contactor 226, 227 and 228 and over line 235 to the respective "retaining circuit" finger on the drum control switch.

Referring now particularly to Figure 1, the direction contactors associated with the propulsion motor (not shown) are shown at 1, 2, 1 being the contactor associated with the "astern" drive of the motor and 2 being the contactor associated with the "ahead" drive of the motor. The direction contactors 1, 2, serve for reversing the main current connections to the motor from the generator. Part of the master control drum switch is shown at 3 in the "stop" position. Fingers 4, 5a, 5b, 5c, 5d, 6, 7, 8 and 9 are provided on the master control drum switch, the first of which fingers 4 is connected to an operating supply bus bar 26. Fingers 5a, 5b, 5d and 5c are respectively connected to the coil 223 of the generator field circuit contactor 220, the coil 224 of the motor field circuit contactor 221, the coil 225 of the booster field contactor 228 and a retaining circuit for the generator motor and booster field and circuit contactors in turn complete the circuits upon engagement with their associated drum switch segments. Finger 6 on the master control serves to complete a circuit through a separate reversing switch 10, having "ahead" and "astern" contacts 11, 12 over lead 13 which reversing switch serves to set up circuits, for operating the "astern" and "ahead" direction contactors 1, 2 respectively. Assuming the master control switch 3 to be in the "off" or "stop" position, both direction contactors 1, 2 will be open and accordingly contacts 14, 15 associated and moving with the "ahead" contactors 2 will be closed, whilst contact 16 on the same will be open. Similarly contacts 17, 18 on the "astern" contactor will be closed whilst contacts 19 will be open. Contact 12 on the reversing switch 10 is connected by a lead 20 to one of the contacts 15 which when closed, i. e. when direction contactor 2 is in the open position and when the contactor 1 is in the open position also, completes a circuit over lead 21, contacts 17 associated with direction contactor 2, lead 22, operating coil 23 of contactor 2 and lead 24 to the negative bus-bar 25. Similarly with both direction contactors 1, 2 open and master control switch in the "off" position, a circuit is completed from "astern" contact of reversing switch 10 over line 27, contacts 18 associated with direction contactor 1, line 28, contacts 14 associated with direction contactor 2, line 29, operating coil 30 of the contactor 1 and line 31 to the negative operating supply bus-bar 25. Accordingly, if now the master control switch is moved from the "off" or "stop" position to its first operative position, and the reversing switch 10 is put into the "ahead" position, a circuit is made from the positive bus-bar 26 line 32, finger 4, the segment associated therewith, the segment associated with finger 6, line 13, contact 12 of the reversing switch 10 and the circuit indicated above from the contact 12 of the reversing switch 10 through the coil 23 to negative bus-bar 25. The ahead direction contactor 2 is accordingly closed, and thereby causes the motor circuit to be completed. At the same time as the direction contactor 2 is closed, contacts 14 and 15 associated therewith are opened while contacts 16 are closed. The opening of the contacts 14 ensures that the "astern" direction contactor 1 cannot be closed while the "ahead" direction contactors 2 are closed, since the circuit to the operating coil 30 of the direction contactor 1 cannot then be completed. It may be noted, that the reverse is also true, i. e. that the direction contactor 2 cannot be closed while direction contactor 1 is closed, since, in similar manner, the circuit to the operating coil 23 cannot be completed. Upon the closing of the direction contactor 2, as described above, the contacts 16 associated therewith are also closed and a circuit is thereby completed from positive bus-bar 26, line 32, finger 4 of the master controller 3, the segment associated with finger 4, the segment associated with finger 7, finger 7, line 33, an economy resistance 34, line 35, contacts 16, line 36, line 21, contacts 17, line 22, operating coil 23 of direction contactor 2, line 24, to negative bus-bar 25. Accordingly the direction contactors 2 are maintained in the closed position. Similar provision is also made for maintaining the direction contactors 1 in the closed position when once they have moved thereto, following on movement of the reversing switch 10 to the astern position, a circuit being made from positive bus-bar 26, line 32, finger 4, finger 7, line 33, economy resistance 34, line 37, contacts 19, line 38, line 28, contacts 14, line 29, operating coil 30 of contactor 1, line 31 to negative bus-bar 25.

At the same time, when the controller is moved to the first position, the turbine 202 is started up by associated control gear (not shown) and is run up to a low speed, for example, 1/30th full speed. If now the controller is moved to the second position, the finger 6 disengages with the associated segment, but the reversing contactor coil circuits which have been set up are maintained in the manner described above through the continued engagement of the finger 7 with its associated drum switch segment. At the same time the turbine speed is run up to for example ⅛th full speed, whilst the generator field 209 is doubly excited through the engagement of the finger 5a with its associated drum switch segment which completes the circuit of the coil 223 and thus causes the contactors 220 and 226 to close. The motor 207 is then run up, as an induction motor, to approximately ⅛th full speed. Further movement of the master controller is then prevented by means of a sequence catch, until the motor has substantially attained ⅛th full speed. When this is so, the controller is then moved to a third position, in which finger 5b engages with its associated drum switch segment, thereby energizing the coil 224 and closing the contactor 221 and 227 and thus making the circuit through the field 210 of the propulsion motor 207. At the same time, through the engagement of finger 5c with its associated drum switch segment, retaining circuits for the generator and motor field contactors 220 and 221 over line 235 and auxiliary contactors 226, 227 are made. At the same time, the motor 207 pulls into synchronism, further movement of the controller until the motor has actually pulled into synchronism, is prevented by another sequence catch (not shown). When the motor has pulled into synchronism the controller can then be moved into a fourth position in which finger 5d engages with its associated drum switch segment and completes the circuit to the coil 225 of the contactor 222 which closes and excitation is applied to the field 211 of the booster 203 associated with the alternator 201 which reduces the excitation of the alternator field 209 to normal. Further movement of the controller alters the variable speed governor associated with the turbine for any speed between ⅛th and full speed.

Upon moving the master controller back from the full-on position, it will be seen that the motor, generator and booster fields 209, 210 and 211 are maintained excited back into the first position of the controller over the line 235, through the continued engagement of the "maintaining" segment associated with the finger 5c and the finger 5c. On moving the controller into the "off" or "stop" position, through the disengagement of this segment and finger 5c the generator motor and booster fields are deenergized. In accordance with the invention, in order now to prevent whichever direction contactor is in the closed position, from moving into the open position immediately following the interruption of the circuit of its operating coil at the finger 7 consequent upon the movement of the master controller into the "off" or "stop" position, and thus to avoid the necessity of the direction contactors breaking heavy induced currents, time delay means 39 are provided which after the movement of the master controller to the "off" or "stop" position, delay the deenergization of the operating coil of the closed contactor for a time sufficient to ensure that the heavy currents induced, upon breaking the generator field circuit and the motor field circuit, have died away. In the arrangement shown, two additional fingers 8, 9 are provided in the master controller which are bridged for a distance between the "off" or "stop" position and the position in which the generator and motor field circuits are broken, when the controller is in the "off" or "stop" position by the drum segment 40; the bridging of these two contacts completes a circuit from negative bus-bar 25 and energizes a relay device, over line 41, contact 9, segment 40, contact 8, line 42, coil 43, line 44 to positive bus bar 26. Coil 43 is associated with contacts 44B, which when bridged complete a circuit over lines 45 and 33, and maintains the direction contactors closed. Also associated with the contacts 44B is the time delay mechanism 39, comprising for example, a clock mechanism.

The relay device comprises the operating coil 43 which when energized draws up the member 43a. The member 43a is connected by means of a spring 43b with the pivoted arm 44a carrying the member which makes the contacts 44B. Also attached to the arm 44a is the time delay mechanism 39. The actual contact member 44B is, for example, elongated and dips into mercury cups forming the contacts 44B, so that the contacts are bridged while the contact maker is being slowly drawn up, when the coil 43 is energized, the rate of withdrawal being dependent on the setting of the time delay mechanism 39. Accordingly, when the controller 3 is returned to a position in which the motor, generator and booster field circuits are broken, although the coil 43 is immediately energized, contacts 44 are bridged for a time dependent on the setting of the time delay mechanism 39 and are then opened, with a consequence that the previously closed direction contactor is opened after a suitable time has elapsed from the return of the controller to the off position and interruption of the field circuits. Whilst in the arrangement shown the clock mechanism is adapted to break a circuit on slow-moving contacts, in some cases it may be more desirable to let the clock mechanism close a circuit after a suitable time delay, to operate a secondary relay which will open the direction contactor's maintaining circuit with a quick-break action.

In the arrangement shown in Figure 2, the circuit is modified to show the use of main direction contactors of the type which are closed electrically, are latched into the closed position and are tripped out by an independent trip coil, a time lag device being incorporated to prevent the tripping of a closed direction contactor immediately a master control device has been returned to an "off" or "stop" position. In the diagram, the connection of the propulsion motor 207 to the generator 201 is effected by means of direction contactors 46 and 47, the contactor 46 connecting the motor for astern drive and the contactor 47 connecting the motor for ahead drive. Associated and moving with the "astern" contactor 46 are contacts 48 and 49, adapted respectively to break and to make circuits through their associated contacts when the contactor 46 is in the open position, and respectively to make and break the said circuits when the contactor 46 moves into the closed position. Also associated with the "astern" contactor 46, are a closing coil 50, a mechanical latching-in arrangement of any known suitable construction indicated diagrammatically at 236 and a tripping-coil 51. Similarly, associated and moving with the "ahead" contactor 47 are contacts 52, 53, adapted respectively to break and make circuits through their associated contacts when the contactor 47 is in the open position and respectively to make and break the said circuits when the contactor 47 moves into the closed position. The contactor 47 is provided with a closing coil 54, a mechanical latching-in arrangement 237 and a tripping coil 55. The actual selection of a direction contactor is effected by a reversing switch 56 provided with "astern" and "ahead" positions in which the moving member of the switch makes with contacts 57 and 58 respectively. Part of the main drum controller is shown at 59, in the "stop" position, in which fingers 60 and 61 are connected by segment 62, whilst fingers 63, 64, 65a, 65b, 65c, and 65d are all disconnected from their associated drum-switch segments 66, 67, 68a, 68b, 68c, and 68d which segments are all electrically connected together.

The "closing" circuit for the selected direction contactor is made through a contactor 69, provided with a short-rated operating coil 70. The "tripping" circuit for whichever direction contactor is closed is made through a contactor 71, provided with associated contacts 72 and 73 and an operating coil 74. Associated with the contactor 71 is a time-delay mechanism 75 which prevents the closing of the contactor 71 until a predetermined time after the closing coil 74 of the contactor 71 has been energized. The contact 73 associated and closing with the contactor 71, itself makes a closing circuit when closed, for a contactor 76 which prepares a circuit for closing contactor 70. The contactor 76 is provided with an operating coil 77 and an associated contact 78. There is also provided a "cut-out" contactor 79 provided with an operating coil 80 and having associated therewith a time delay mechanism 80a of short period, which prevents the closing of the contactor 79 for, say, half a second after its operating coil 80 has been energized. The operation and connection of this contactor will be described later in the specification. The control circuits are fed from bus bars 81 and 82 when the switch 82a is closed. When the drum switch is in the "off" or "stop" position it being assumed that the direction contactors are both open, a circuit is made from the negative operating supply bus bar 82 along line 84 to finger 61, segment 62, finger 60, line 85, operating coil 74 of contactor 71, which is to start with open so that contacts 72 are closed, contacts 72 and line 86 to the positive bus-bar 81. Accordingly the contactor 71 is closed after a certain time delay determined by the mechanism 75, thereby opening contacts 72 and inserting an economy resistance 87 in series with the coil 74 which accordingly maintains contactor 71 closed. The closing of the contactor 71 causes the contact 73 also to close. This makes a circuit from positive bus-bar 81 over line 88, contactor 73, resistance 89, operating coil 77 of of contactor 76, line 90 to negative bus-bar 82. Contactor 76 accordingly closes, at the same time contact 78 moving with contactor 76 also closes and makes a holding circuit for contactor 76 from positive bus-bar 81 over line 88, line 91, contacts 78, line 92, resistance 89, operating coil 77 and line 90 to negative bus-bar 82. The contactor 76 therefore remains closed, even if the contactor 73 now opens. The contactor 76 by closing prepares a circuit from finger 63 on the master controller over line 93 contacts 76 and line 94, line 95, operating coil 70 of "closing" contactor 69 and line 96 to negative bus-bar 82.

Accordingly if now the reversing switch is put, for example, in the "astern" position, i.e. making with contact 57 and the controller 59 is moved from the "stop" or "off" position into its first operative position, thereby in known manner causing the turbine to be started and run up to a low speed, segment 66 makes contact with finger 63 and segment 67 with finger 64 which is connected to the positive operating supply bus-bar by a line 83. At the same time, segment 62 disengages with fingers 60 and 61 and accordingly the circuit through the operating coil 74 of the contactor 71 is interrupted and this contactor accordingly opens so that no circuit can be made through either of the tripping coils 51 or 55 of the main direction contactors. The engagements of segments 66 and 67 with fingers 63 and 64 causes a circuit to be set up from the positive bus-bar 81 over line 83, finger 64, segments 67 and 66, finger 63, line 93, contactor 76 (which is in the closed position as described above), line 94, line 95, operating coil 70 of contactor 69 and line 96 to the negative supply bus bar 82. The contactor 69 thereupon closes and completes a circuit from the positive supply bus-bar 81 over line 97, contactor 69, line 98, reversing switch 56 (which has been set in the "astern" position) contact 57, line 98a, contacts 53 associated with direction contactor 47 and only closed when "ahead" direction contactor 47 is open, line 99, closing coil 50 of "astern" direction contactor 46, line 100 to the negative supply bus-bar 82. The "astern" contactor is accordingly closed making the desired connection of the propulsion motor to the generator.

As stated above, the operating coil 70 of the "closing" contactor 69 is short-rated, accordingly when once it has been closed and has effected the desired control, it is desirable to trip it out again. For this purpose a part of the control current, through the operating coil 70 is diverted by way of lead 101, through the operating coil 80 of the contactor 79 and over leads 102 and 90 and to the negative bus-bar 82. As stated above a time-delay device, providing a time-delay of the order of one half second is associated with the contactor 79, which while not delaying its opening, delays its closing by the predetermined amount. Accordingly after the predetermined time after the "closing" contactor 69 has been closed, to effect the closing of the desired direction contactor, which is then mechanically latched-in, the contactor 79 closes. Thereupon a circuit is made from the negative bus-bar 82, over lead 90, lead 102, contacts 79, lead 103, resistance 89, lead 92, contacts 78, lead 91 and lead 88 to the positive bus-bar 81, thus short-circuiting the operating coil 77 of the contactor 76. The contactor 76 thereupon moves to the open position, accordingly the circuit through the operating coil 70 of the "closing" contactor 69 is deenergized and this contactor also opens, as does the contactor 79.

If however the reversing switch 56 is originally put in the "ahead" position, i. e. making with contact 58, in a similar manner to the above and if contactor 69 is closed as described above, a circuit is made from positive bus-bar 81, line 97, contacts 69, line 98, reversing switch 56, contact 58, line 104, contacts 49 associated with "astern" direction contactor 46 and only closed when the said "astern" direction contactor is open, line 105, closing coil 54 of the "ahead" direction contactor 47, line 100, to negative bus-bar 82. The "ahead" direction contactor 47 is accordingly closed. In the same manner after the elapse of the predetermined time set by the time delay device 81, the contactor 79 closes, thus causing the consequent opening of the contactor 76 and the "closing" contactor 69 and also the deenergization of its own operating winding 80, so that it also opens. It should be noticed that by the provision of the contact 53, associated and moving with the "ahead" direction contactor 47 and the contact 49 associated and moving with the "astern" direction contactor 46, it is ensured that one direction contactor cannot be closed if the other direction contactor is already in the closed position.

When the desired direction contactors have been closed, and as previously stated, latched into the closed position, the controller is then moved into the second position. As previously described the turbine is then speeded up to, say, ⅕th full speed. Upon the movement of the controller into the second position, the finger 65a engages with the drum switch segment 68a the circuit of the coil 223 is completed over the lines 232 and 230. The contactors 220 and 226 then close and accordingly the alternator field 209 is doubly excited. The motor 207 is then allowed to run up to approximately ⅕th full speed as an induction motor, further movement of the controller until the motor has attained the desired speed is prevented by means of a sequence catch (not shown) provided on the controller. After release of the sequence catch, the controller can then be moved into the third position in which through the engagement of finger 65b with the drum switch segment 68b, the circuit of the coil drum completed over the lines 229 and 233. The contactors 221 and 227 then close and the motor field circuit is made. At the same time, through the engagement of finger 65c with its associated drum switch segment 68c, retaining circuits for the generator and motor field contactors are made over lines 235 and through auxiliary contactors 226 and 227. The motor 207 then pulls into synchronism, and as in the previous arrangement, movement of the controller until the motor has synchronized is prevented by means of a sequence catch (not shown) on the controller. In the next position, the excitation of the alternator 209 is reduced to normal since the field coil 211 of the booster 203 is energized owing to the engagement of the finger 65d with the segment 68d completing the closing circuit for the contactors 222 and 228. Finally the remaining operative control positions on the controller operate on an automatic variable speed governor on the turbine, to give speeds between ⅕th full speed and full speed. As before it will be seen that, on returning the controller to the "off" or "stop" position, the excitation of the generator motor, booster and fields is maintained into the first position, by circuits completed through the continued engagement of the finger 65c with the associated drum switch segment 68c, through the coils 223, 224 and 225 over the line 235 and the auxiliary contactors 226, 227 and 228.

Upon now moving the master control switch 59 to the "off" or "stop" position, the field circuits of the generator, motor and booster are broken by the disengagement of the segment 68c from the finger 65c when the controller passes from the first to the "off" or "stop" position; on moving into the "off" or "stop" position, the segment 62 makes with contacts 60 and 61. In this manner a circuit is completed from the negative bus-bar 82 over the line 84, through finger 61, segment 62, finger 60, line 85, operating coil 74 of the contactor 71, contacts 72, and line 86 to positive bus-bar 81. The operating coil 74 is accordingly energized, but the contactor 71 is not immediately closed owing to the action of the time-delay mechanism 75, which only allows the contactor 71 to close after a period sufficient to allow the transient heavy currents induced in the main generator motor circuit upon the breaking or deenergization of the generator and the motor fields, to die away so that whichever direction contactor is closed can be opened without being heavily overloaded. The actual opening of the direction contactors is effected by energization of their respective tripping coils. For example, if the "astern" direction contactor 46 is in the closed position, upon the delayed closing of the contactor 71, as described above, a circuit is completed from the positive bus-bar 81 over the line 106, through contacts 71, over line 107, over line 108, through contacts 48, over line 109, through trip coil 51 associated with the "astern" direction contactor 46, over line 100 to negative bus-bar 82. The "astern" direction contactor 46 is accordingly tripped open. In a similar manner, if the "ahead" direction contactor 47 is the contactor which is closed when the master controller 59 returns to the "off" or "stop" position, and which is therefore to be tripped open, after the predetermined time interval has elapsed and the contactor 71 closes (in precisely the same manner as described above), a tripping circuit is completed from positive bus-bar 81, over line 106, through contacts 71, over line 107, line 110, through contacts 52, over line 111, through tripping coil 55 associated with direction contactor 47 and over line 100 to the negative bus-bar 82.

In either of the arrangements described above it is to be understood that the time-lag in the closing, in the arrangement shown in Figure 1, of the relay 39 and in the arrangement shown in Figure 2, of the contactor 71, due in each case to their associated time delay mechanisms, is so chosen that under the most severe conditions, when the master controller is quickly turned to the off position from the full-speed position or from a position in which double excitation is applied to the alternator, the heavy transient currents, due to induced voltages caused on deenergizing the field circuits of both the motor and the generator, have fallen to a zero or a relatively small value. The time lag device for the relay 39 and the contactors 71 and 79 may, for example, be of the type described in British patent specification No. 354,899, in which the time lag device comprises a clockwork mechanism.

In the arrangement shown in Figure 3, the inhibition of the opening of the reversing switching means is derived from means responsive to the main current. The main direction contactors are shown at 112, 113. Direction contactor 112 is that direction contactor which sets up the "astern" driving connections for the motor whilst direction contactor 113 is that which sets up the "ahead" driving connections for the motor. Associated and moving with "astern" direction contactor 112 are contacts 114, 115, 116, whilst a common operating coil 117 is provided. The arrangement of the contacts is such that the contacts 114 and 115 are closed and the contact 116 is open whilst the direction contactor 112 is open and vice-versa. Similarly associated and moving with ahead direction contactor 13 are contacts 118, 119, 120, whilst a common operating coil 121 is provided. The arrangement of the contacts is such that the contacts 118 and 119 are closed and the contact 120 is open, when the direction contactor 113 is open, and vice-versa. As in the two previous arrangements, there is provided a two position reversing switch 122 having an "astern" position in which it makes with contact 123 and an "ahead" position in which it makes with contact 124. Part of the master controller is shown at 125; the master controller is provided with fingers 126, 127, 128a, 128b, 128c, 128d and 129 and associated drum switch segments 130, 131, 132a, 132b, 132c, 132d and 133. The controller 125 is shown in the drawing in the "off" or "stop" position.

If now the master controller is moved from the "off" or "stop" position into the first operative position, steam is supplied to the turbine which is then run up to a low speed, for example 1/30th full speed. A circuit is now completed from the positive bus-bar 134, over line 135, finger 129, segment 133, segment 131, finger 127, line 138, reversing switch 122, "astern" contact 123, line 139, contact 115, line 140, contact 118, line 141, operating coil 117 and line 142 to the negative bus-bar 137. The "astern" direction contactor 112 is accordingly closed, and in closing makes a holding circuit for itself by completing a circuit through contact 116 from positive bus-bar 134, line 135, finger 129, segments 133 and 134, finger 126, line 143, economy resistance 144, line 145, contactors 116, line 146, line 140, contactors 118, line 141, operating coil 117 and line 142 to negative bus-bar 137.

In a similar manner, if the reversing switch 122 had been in the "ahead" position, the "ahead" direction contactor would have been closed by the completion of a circuit from the positive bus-bar 134, over line 135, finger 129, drum switch segment 133, segment 131, finger 127, line 138, reversing switch 122, contact 124, line 147, contacts 119, line 148, contacts 114, line 149, operating coil 121 and line 150 to the negative bus-bar 137. A holding circuit for the contactor is made, on closing, by completing a circuit through contacts 120 from positive bus-bar 134, line 135, finger 129, segments 133 and 131, finger 126, line 143, resistance 144, line 151, contacts 120, line 152, line 148, contacts 114, line 149, line 121 and line 150 to the negative bus-bar 137.

On moving the controller to the second operative position, the finger 128a engages with the associated drum switch segment 132a. Accordingly the generator field contactor coil 223 is energized to close the contactor and the generator is then doubly excited. Simultaneously the turbine speed is increased from its low speed for example 1/30th full speed, up to a speed of, for example, 1/5th full speed. The motor then runs up as an induction motor to approximately 1/5th full speed. When the motor 207 has substantially attained this speed a sequence catch (not shown) on the controller allows the controller to move into a third position, wherein by the engagement of the finger 128b with the associated drum switch segment 132b, a circuit is completed over line 233 which causes the closing of motor field contactors 221 and 227 and thus causes the excitation of the motor field. The motor accordingly then pulls into synchronism, as before, a sequence catch being provided on the controller which ensures that it cannot be further moved until the motor has actually pulled into synchronism. A maintenance circuit for the generator and motor field contactors, is also set up, that for the generator field actually being set up in the second operative position of the controller, through the engagement of finger 128c with the associated drum switch segment 132c over the line 235. Further movement of the controller away from the "off" or "stop" position results in the reduction of the alternator excitation to normal, thereafter the controller is operative upon an automatic variable speed governor associated with the turbine whereby speed settings between 1/5th full speed and full speed can be maintained.

It will be seen that the generator motor and booster field circuits are maintained, through the continued engagement of the segment 132c with the finger 128c over line 235, on moving the controller back from the "full on" position right into the first position.

The circuit of the master controller 125 between the bus-bar 134 and the conductor 143 is arranged to be shunted by a line 153 connected to the line 143 and forming part of a circuit from the positive bus-bar 134 over line 154 and the contacts 155 of a relay 156 which is adapted quickly to close its contacts 155 but slowly to open them under the control of a time delay mechanism 157. The relay 156 comprises a pivoted member 156a associated with the time delay device 157 which carries the contact maker 155, and coupled by means of a spring with a movable member in the operating coil 158 of the relay. The contact maker 155, making across contacts 155, preferably comprises contacts which are elongated and, for example, dip into mercury cups, so that they can continue to make circuit while being slowly opened under the influence of the time delay device 157. The operating coil 158 of the relay 156 is connected in a circuit from the negative bus-bar 137 over line 159, operating coil 158, line 160, through contacts 161 of a current relay provided with an operating coil 162 and over line 163 to the positive bus-bar 134. The current relay operating coil 162 is energized through a current transformer 164 from a phase of the main generator motor circuit, the current relay is such that its contacts 161 are closed unless a predetermined low current is flowing in its coil 162. Accordingly in normal operation, either "ahead" or "astern" the contacts 161 of the current relay are closed with the result that the coil 158 is energized, the contacts 155 of the relay 156 are closed and the master controller finger 126 and associated drum switch segment 130 are shunted by the circuit through line 154, contacts 155 and line 153. If now, from an operative position, for example, the "full on" position, the master controller is brought back to the "off" or "stop" position, the holding circuit for whichever direction contactor is closed, is maintained over the line 154 and contacts 155 and line 153. When now the heavy currents induced in the main generator motor circuit, have died to a low value, the current induced in the secondary of the current transformer 164 and flowing in the coil 162 of the current relay, is insufficient to maintain the relay closed and the relay accordingly opens its contacts 161. In consequence, the circuit in which the contacts 161 are connected is broken and hence the coil 158 is deenergized. In consequence after a time lag, determined by the mechanism 157, the contacts 155 are opened, with a result that the previously operative direction contactor is tripped out. The time lag is provided on the contactor 156, in order to prevent the direction contactor tripping in the event of the current induced in the secondary winding of the current transformer 164 momentarily falling to a low value before whichever direction contactor is in the closed position, can safely be opened.

In an arrangement in accordance with the invention it is to be understood that the direction contactors may be other than electromagnetically operated, for example, they may be pneumatically operated and electrically controlled.

The invention may be applied to an arrangement such as that described in British patent specification No. 352,615 in which a plurality of alternators and a plurality of motors may operatively be grouped in various ways. The motor or motors may moreover be of the asynchronous type.

We claim:—

1. A control system for an alternating current electric motor comprising an alternator for supplying power to the motor, an alternator field winding arranged to be excited with direct current, switching means for effecting reversal of connections between the alternator and the motor, control means adapted to control the excitation of the said field winding and to effect a reduction in the field flux of the alternator before the said switching means are operated and means arranged, when the field flux prior to operation of the switching means is reduced by operation of the control means, to allow operation of the switching means only after the expiration of a time delay.

2. A control system for an alternating current electric motor comprising an alternator for supplying power to the motor, an alternator field winding arranged to be excited with direct current, switching means for effecting reversal of connections between the alternator and the motor, control means adapted to control the excitation of the said field winding and to effect a reduction in the field flux of the alternator before the said switching means are operated and a time delay relay arranged, when the field flux prior to operation of the switching means is reduced by operation of the control means, to allow operation of the switching means only after the expiration of a time delay.

3. A control system for an alternating current electric motor comprising an alternator for supplying power to the motor, an alternator field winding arranged to be excited with direct current, switching means for effecting reversal of connections between the alternator and the motor, control means adapted to control the excitation of the said field winding and to effect a reduction in the field flux of the alternator before the said switching means are operated and a relay operatively associated with the circuit of the alternator and motor and responsive to a condition of the said circuit and adapted to prevent operation of the said switching means at least while the current flowing in the circuit is above the normal current rupturing capacity of the switching means.

4. A control system for an alternating current electric motor comprising an alternator for supplying power to the motor, an alternator field winding arranged to be excited with direct current, switching means for effecting reversal of connections between the alternator and the motor, control means adapted to control the excitation of the said field winding and to effect a reduction in the field flux of the alternator before the said switching means are operated, a current transformer operatively associated with the circuit of the alternator and motor, a relay provided with a coil arranged to be energized through the current transformer and means controlled in dependence on the value of current in the relay coil and adapted to operate with a time lag and arranged, when the field flux prior to operation of the switching means is reduced by operation of the control means, to prevent operation of the switching means before the current in the relay coil has remained below a predetermined value for an agreed period of time.

5. A control system for an alternating current electric motor comprising an alternator for supplying power to the motor, an alternator field winding arranged to be excited with direct current, reversing contactors respectively provided with maintaining coils for maintaining the contactors closed, the said contactors being arranged to effect reversal of connections between the alternator and the motor, a controller arranged with operative positions and an off position and adapted to control the excitation of the said field winding and to effect a reduction of the field flux of the alternator when turned to the off position, contacts on the controller arranged to effect energization of one of the maintaining coils while the controller is in an operative position and to effect deenergization of the said coil when the controller is turned to the off position, and relay contacts which are connected in parallel with the said contacts on the controller, which are closed while the controller is in an operative position and which are adapted to open with a time delay when the controller is turned to the off position.

6. A control system for an alternating current electric motor comprising an alternator for supplying power to the motor, an alternator field winding arranged to be excited with direct current, reversing contactors respectively provided with tripping coils for effecting opening thereof and arranged to effect reversal of connections between the alternator and the motor, a controller arranged with operative positions and an off position and adapted to control the excitation of the said field winding and to effect a reduction of the field flux when turned to the off position, contacts on the controller, a relay which is provided with a coil the energization whereof is controlled through the said contacts on the controller and which is provided with contacts adapted when the controller is turned to the off position to close with a time lag and thereby to effect energization of the tripping coil of that contactor which is closed.

7. A control system for an alternating current electric motor comprising an alternator for supplying power to the motor, an alternator field winding arranged to be excited with direct current, reversing contactors respectively provided with maintaining coils for maintaining the contactors closed and arranged to effect reversal of connections between the alternator and the motor, a controller arranged with operative positions and an off position and adapted to control the excitation of the said field winding and to effect a reduction of the field flux of the alternator when turned to the off position, contacts on the controller arranged to effect energization of one of the maintaining coils while the controller is in an operative position and to effect deenergization of the said coil when the controller is turned to the off position and relay contacts which are connected in parallel with the said contacts on the controller and which are closed while the controller is in an operative position and means including a relay element operatively associated with the circuit of the motor and generator and responsive to a condition of that circuit and adapted to prevent opening of the said relay contacts while the current flowing in the circuit is above the normal current rupturing capacity of the contactors.

8. A control system for an alternating current electric motor comprising switching means for effecting reversal of connections between a supply of electrical power and the motor, a motor field winding arranged to be excited with direct current, control means adapted to control the excitation of the said winding and to effect a reduction in the field flux of the motor before the said switching means are operated and means arranged, when the field flux prior to operation of the switching means is reduced by operation of the control means, to allow operation of the switching means only after the expiration of a time delay.

9. A control system for an alternating current electric motor comprising switching means for effecting reversal of connections between a supply of electrical power and the motor, a motor field winding arranged to be excited with direct current, control means adapted to control the excitation of the said winding and to effect a reduction in the field flux of the motor before the said switching means are operated and a relay operatively associated with the circuit of the alternator and motor and responsive to a condition of the said circuit and adapted to prevent operation of the said switching means at least while the current flowing in the circuit is above the normal current rupturing capacity of the switching means.

HERBERT JOHN COATES.
CHARLES WALLACE SAUNDERS.